Aug. 18, 1959 S. G. BOWMAN 2,900,164
PIPE ORGAN VALVES
Filed July 10, 1957

United States Patent Office 2,900,164
Patented Aug. 18, 1959

2,900,164

PIPE ORGAN VALVES

Samuel G. Bowman, deceased, late of Mount Lebanon Township, Allegheny County, Pa., by Virginia B. Caldwell, administratrix, Mount Lebanon Township, Allegheny County, Pa., assignor of one-half to Anna H. Bowman, Mount Lebanon Township, Allegheny County, and one-half to James M. Guthrie, Crafton Borough, Allegheny County, Pa.

Application July 10, 1957, Serial No. 671,102

4 Claims. (Cl. 251—138)

The invention relates to pipe organs, and consists in certain new and useful improvements in the valves and actuating devices that control the flow of air to the organ pipes.

The usual pneumatic pipe organ has a wind-box or air-chest, in which a supply of air is maintained under superatmospheric pressure. The pipes stand with their air-receiving ends arranged to communicate with the supply of air in the chest, and means are provided to control the flow of air between the air-chest and the pipes. Such means comprise air passages extending between the pipes and the chest, and electrically actuated valves for controlling the flow of air through such passages. The valves normally rest in closed positions, and it is when the valves are electrically energized that the valves open and permit pipe-sounding streams of air to flow.

The electrical energizing circuits of the valves are controlled by the keys and stops of the organ manual, whereby the pressing of a particular key of the manual closes the circuit of the valve of the corresponding organ pipe, with the effect that the valve of such pipe opens, air flows from the chest, and the pipe speaks. By proper manipulation of the keys of the manual the organ is played, causing the pipes to sound in musical order. By means of stops, multiple relays and coupler stacks, all known to the art, the valves of various combinations of pipes may be caused to respond selectively to one or more of the keys and/or stops of the manual. A more detailed description of pipe organs is unnecessary to an understanding of the invention.

The object of the invention is to provide an improved pneumatic control device for organ pipes, whereby it is merely necessary to cut a hole in the wall of an air-chest, secure the unit in place, and set the pipe. No particular skill is required to do the job with perfection. All pipes of a rank and all air-passages for the pipes, valve seats, valves and electrical valve-actuating devices may be installed in but a fraction of the time hitherto required, and a much superior assembly obtained.

Figure 1:
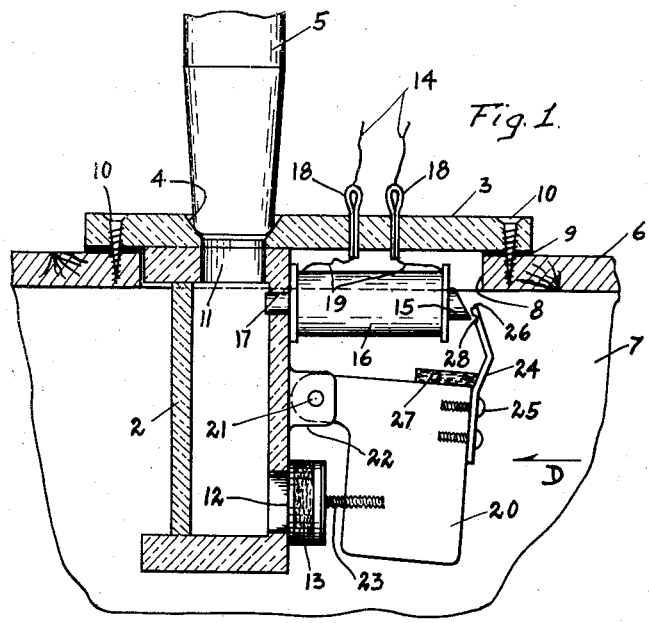
Fig. 1 is a fragmentary sectional view of the horizontal top wall of the air-chest of a pipe organ, showing in vertical section, on the plane I—I of Fig. 2, a unit of the invention installed in service position, and indicating fragmentarily an organ pipe assembled therewith.
Figure 3:
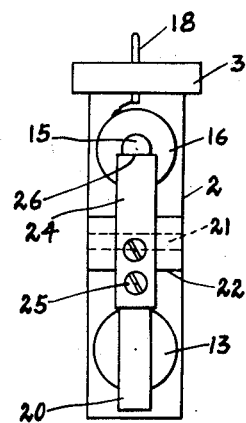
Fig. 3 is a view of the unit in side elevation, as seen from the right of Fig. 1.

Referring to the drawing, the unit or device D of the invention comprises a tubular body or recessed body portion 2 extending downwardly from a top plate or seat portion 3, that includes a seat 4 for the air-receiving end of an organ pipe 5. The device is installed simply by drilling or cutting a hole 8 in the top wall 6 of the air-chest 7, and inserting the device in the hole. A gasket 9 may be used to insure a substantially air-tight union, and screws 10 may be passed through suitable orifices in the plate portion 3 and "run" into the substance of said top wall 6, to secure the device in service position.

The seat 4 for the air-receiving end of the organ pipe 5 includes a passage 11 that opens into the interior of the tubular body 2. Through the lower end of the side wall of body 2 a port or ported valve seat 12 is provided, and on this seat a valve 13 normally rests, blanking the flow of air from the interior of the chest 7 into the body 2. Means are provided for lifting the valve 13 from its seat, whereby a stream of air flows from the air-chest, through the passage 11 into the pipe 5. The pipe is thus caused to speak.

The means for effecting such movement of the valve 13 comprise an electro-magnetically actuated mechanism that is instantly responsive to the opening and closing of an electric circuit 14 controlled by one or more of the keys or stops of the organ manual. The present invention is centered in such mechanism, and in its organization with the other elements of the device D.

More particularly, the valve-actuating mechanism comprises an electro-magnet having a core in the form of a rod 15 of magnetic metal, upon which a cylindrical solenoid or coil 16 of conductor wire is wound. The core 15 of the electro-magnet is fixed (as at 17) in the wall of the body 2, and it will be noted that the body of such electro-magnet is supported in a position that closely parallels the top plate 3. Two conductor posts 18 extend through, and are sealed in, the plate portion 3, and to the inner ends of these posts the terminals of the magnet coil are connected, as by wires 19, while the circuit wires 14 are secured severally to the outer ends of the posts 18.

Below the electro-magnet a flat member or disk 20 is pivotally secured (as at 21) between a pair of lugs 22 extended laterally from the side wall of the body 2. The disk is advantageously formed from a ¼" plate of non-magnetic and non-conductive material, say a plastic material such as Lucite. To the inner edge of the disk 20, at a point below the pivot 21, the valve 13 is secured by means of a stem 23, while at a point opposite to the pivot 21 an armature 24 is secured to the edge of the disk by means of screws 25. The armature 24 is formed of a strip of magnetic material, such as iron, and the strip is fashioned as shown in Fig. 1, providing a projecting distal end that has a tip portion 26 located adjacent to the lower edge of the inclined exposed end face of the magnetic core 15.

When the circuit 14 is closed, as by depressing the appropriate key of the organ manual, the magnet is energized, and in consequence the armature 24 is instantly drawn upwardly across the end face of the core 15, swinging the disk 20 counter-clockwise (Fig. 1) and lifting the valve 13 from its seat. A pipe-sounding stream of air flows into the pipe 5 and continues to flow as long as the said key of the manual remains depressed and the magnet remains energized, holding the disk 20 in upwardly swung position and holding the valve 13 away from its seat. A pad of felt 27 is cemented to the top edge of the disk 20, which acts as a bumper against the bottom of the electro-magnet, to form a cushioned stop when the disk 20 and its associate parts are rapidly "snapped" upwardly under the pull of the electro-magnet.

Upon the release of the depressed key, the circuit 14 opens and the magnet is de-energized. Under the effect of gravity the disk 20 immediately drops back into its illustrated position (Fig. 1), returning the valve 13 to seated position, where it is held by the effect of gravity on the disk 20, plus the effect of the pressure of air in the chest upon the outer face of the valve.

A very efficient pipe-organ valve is realized by virtue of the structural organization described. Further important features remain to be described.

Figures 4, 5:
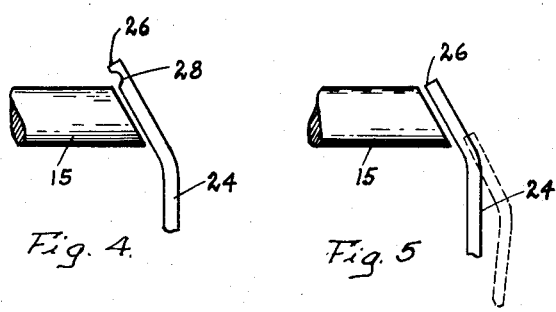
Fig. 4 is a fragmentary view, showing in side elevation and to larger scale a certain armature element in an alternate position from that in which it is shown in Fig. 1.
Fig. 5 is a view similar to Fig. 4, illustrating a structural comparison.

Adjacent to the distal end of the armature 24 a transverse groove 28 is formed, thereby minimizing the mass of metal immediately within the tip of the armature. In other words the provision of the groove 28 results in the armature 24 having a tip portion 26 of greater mass than the body portion of the armature located (as at 28) immediately adjacent to the tip portion 26, and it will be seen in Fig. 1 that, with the electro-magnetic coil 16 deenergized, the tip portion 26 of greater mass is located in closer effective proximity to the exposed end face of core 15 than the rest of the armature body. When the electro-magnet is deenergized and the disk 20 rests in its normal valve-seating position (Fig. 1), the tip portion 26 of the armature is in this case located just above the lower edge of the exposed end face of the magnet core 15, where such tip is adapted to be instantly responsive to the magnetic flux when the magnet is energized. If the tip of an armature without the groove is thus positioned in partially overlapped position with respect to the end of the magnet core, the armature will be quickly responsive to magnetic flux, but the travel of the armature will be limited to substantially the difference between the breadth of the end face of the armature and the distance by which the tip of the armature overlaps the exposed end or face of the armature when the magnet is not energized, as will be understood upon comparing the full-line and dotted-line positions of the armature in Fig. 5. By virtue of the grooved tip construction, however, the travel of the armature will be substantially equal to the full breadth of the end face of the magnet core, as may be understood upon comparing Figs. 1 and 5. This grooved armature structure provides maximum pull and travel for the parts to be operated by the electro-magnet.

Figure 2:
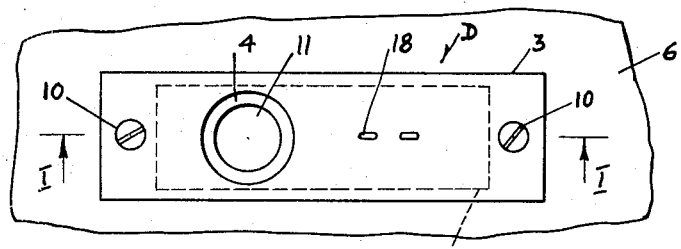
Fig. 2 is a view of the installed unit in top plan, with the organ pipe omitted.

The compact assembly of the pipe-organ valve described is also a feature of notable value. In the illustrated embodiment of the invention, the tubular body 2, the electro-magnet 15, 16, the valve 13 and the valve-actuating mechanism 20, 24 are centered in a vertical plane, with the effect that the assembly may be inserted through a narrow rectangular opening (such as the opening 8, Fig. 2) cut in the top of the air-chest, and it will be noted that the valve 13, the disk 20, and armature 24 are adapted to swing in such plane.

Various modifications of the structure herein illustrated and described may be made without departing from the essence of the invention defined in the appended claims.

I claim:

1. An organ pipe-controlling device adapted for assembly with an opening in the wall of an air-chest, said device comprising a seat portion for the air-receiving end of an organ pipe, a recessed body portion extending from said seat portion, with an air passage opening from the interior of said recessed body portion through said seat portion, the wall of said recessed body portion having a port through which air may enter, a valve normally positioned on said port for blanking the flow of air therethrough, and means for lifting the valve from the port in response to the closing of an electric circuit; said means comprising an electro-magnetic coil extending laterally from said body portion, a magnetic core in said coil, the core being extended from the distal end of the coil and provided at its end with an exposed face, a disk of non-magnetic material disposed in a substantially vertical plane and pivoted at a point adjacent to its edge to said body portion for angular movement in said plane, a stem for securing said valve to the edge of said disk at a point below said pivot, and an armature secured to the edge of said disk at a point substantially opposite to the point at which said disk is pivoted, said armature extending from said disk and having a distal end positioned adjacent to the exposed end face of said core, whereby when said coil is electrically energized said disk is swung upwardly to lift said valve from said port.

2. The structure of claim 1, wherein said armature includes at its said distal end an armature tip portion of greater mass than the body portion of the armature located immediately adjacent to such tip portion, said armature tip portion of greater mass being located in closer effective proximity to the exposed end face of said core than the rest of the armature body when said electro-magnetic coil is deenergized.

3. In a pipe organ air-valve having a valve-actuating mechanism that comprises an electro-magnetic coil with a magnetic core extended therefrom and terminated in an exposed end face, and a pivotally mounted armature connected to said valve, and having a distal end for cooperation with said core; the invention herein described wherein the distal end of said armature comprises a tip portion of greater mass than the body portion of the armature located immediately adjacent to such tip portion, said armature tip portion of greater mass being located in closer effective proximity to the exposed end face of said core than the rest of the armature body when said electro-magnetic coil is deenergized.

4. In a pipe organ air-valve having a valve-actuating mechanism that comprises an electro-magnetic coil with a magnetic core extended therefrom and terminated in an exposed end face, and a pivotally mounted armature connected to said valve and having a distal end for cooperation with said core; the invention herein described wherein said armature includes adjacent to its distal end a transverse groove for providing an armature tip portion of greater mass than the body portion of the armature located immediately adjacent to such tip portion, said armature tip portion of greater mass being located in closer effective proximity to the exposed end face of said core than the rest of the armature body when said electro-magnetic coil is deenergized.

References Cited in the file of this patent

UNITED STATES PATENTS

| | | |
|---|---|---|
| 272,684 | Hall | Feb. 20, 1883 |
| 1,058,956 | French | Apr. 15, 1913 |
| 1,403,930 | Wick | Jan. 17, 1922 |
| 1,887,076 | Warren | Nov. 8, 1932 |
| 1,891,409 | Grant | Dec. 20, 1932 |
| 2,158,010 | Marr | May 9, 1939 |

FOREIGN PATENTS

| | | |
|---|---|---|
| 275,639 | Italy | June 28, 1930 |